Figure 1:
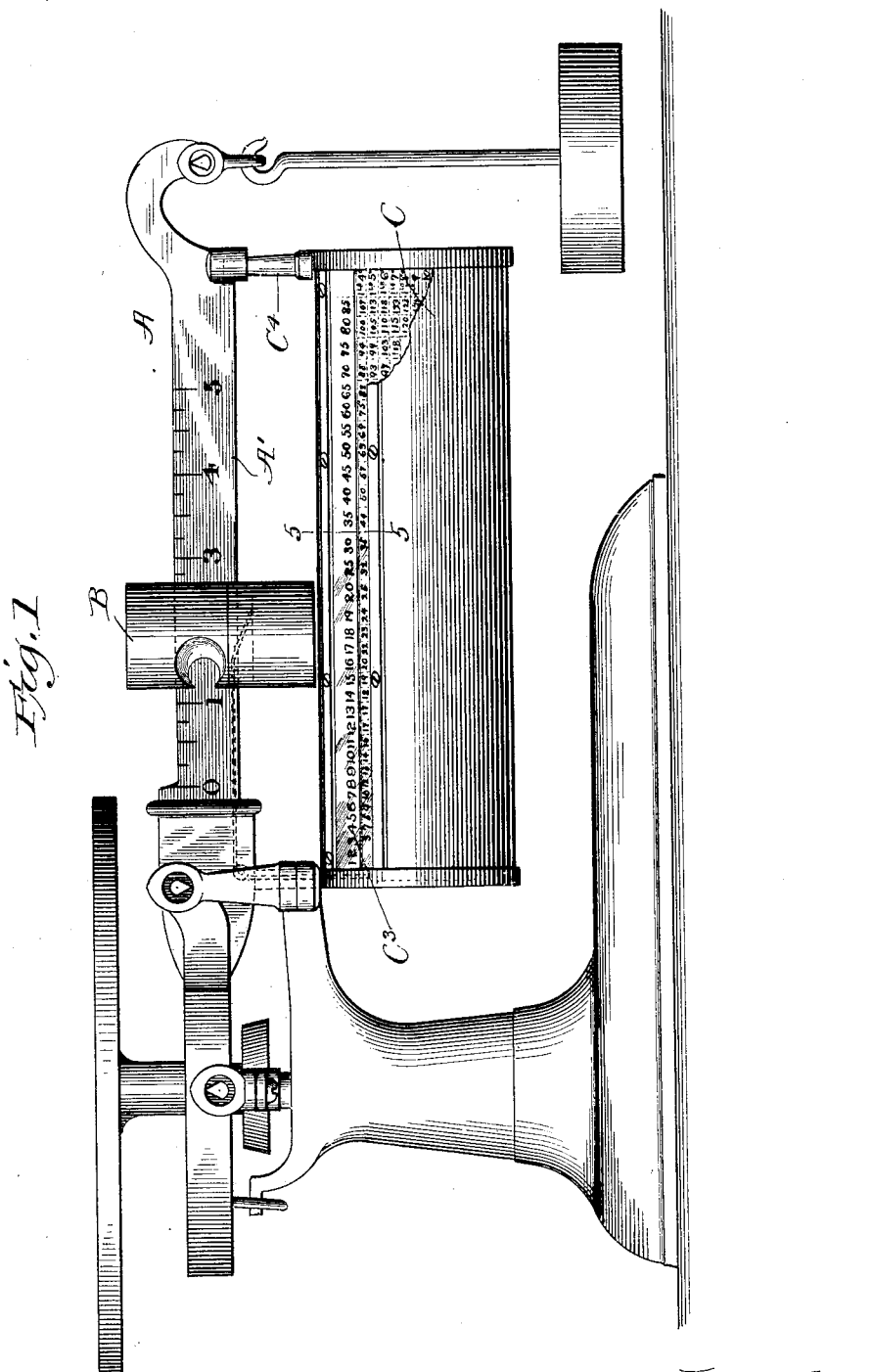

No. 658,641. Patented Sept. 25, 1900.
L. P. HALLADAY.
COMPUTING SCALE.
(Application filed Jan. 13, 1899.)

(No Model.) 2 Sheets—Sheet I.

Witnesses

Inventor
Lewis P. Halladay

THE NORRIS PETERS CO., PHOTO-LITHO., WASHINGTON, D. C.

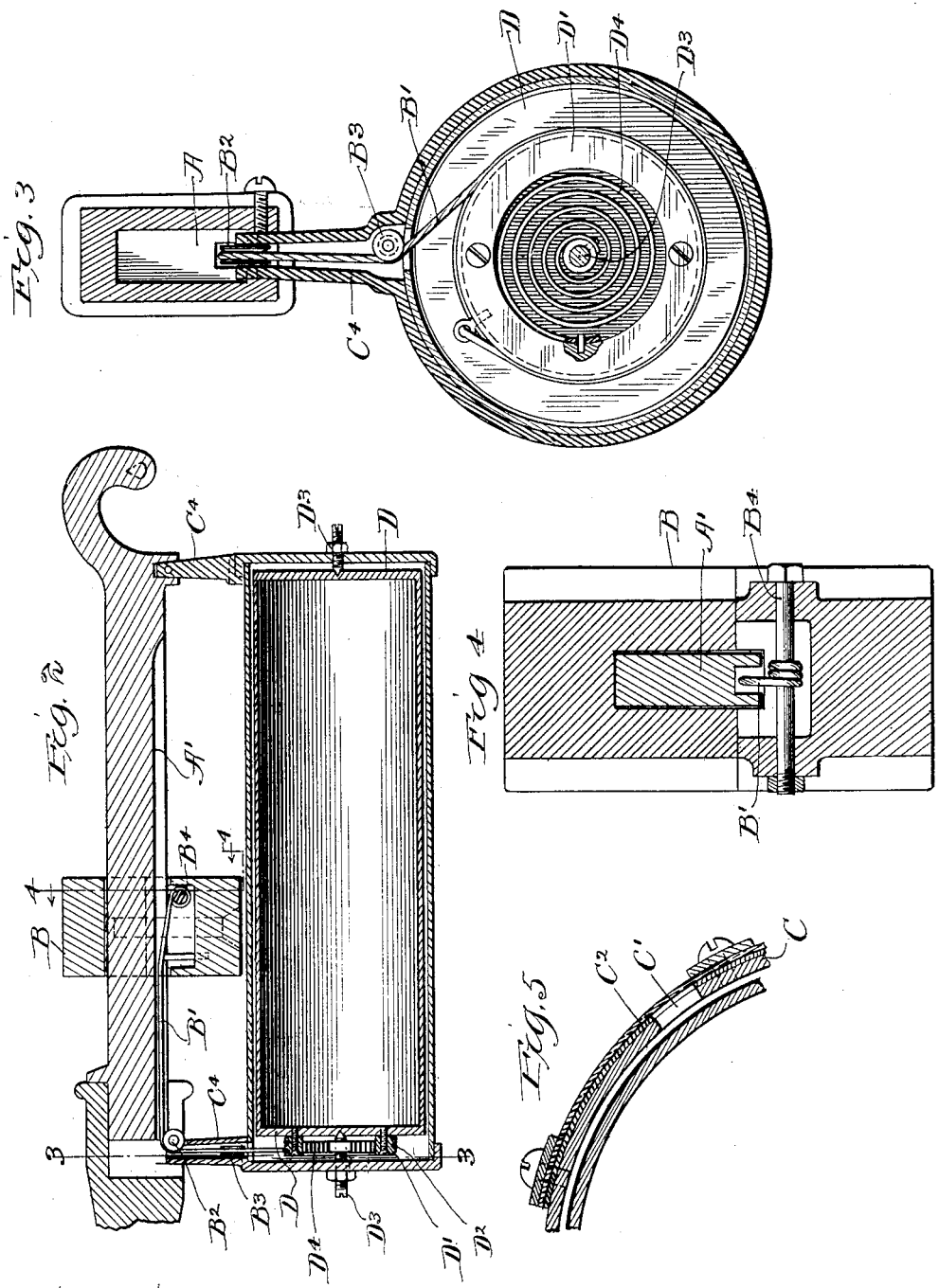

UNITED STATES PATENT OFFICE.

LEWIS P. HALLADAY, OF MARION, INDIANA, ASSIGNOR TO PHILIP MATTER, OF SAME PLACE.

COMPUTING-SCALE.

SPECIFICATION forming part of Letters Patent No. 658,641, dated September 25, 1900.

Application filed January 13, 1899. Serial No. 702,060. (No model.)

*To all whom it may concern:*

Be it known that I, LEWIS P. HALLADAY, a citizen of the United States, residing at Marion, in the county of Grant and State of Indiana, have invented a certain new and useful Improvement in Computing-Scales, of which the following is a specification.

My invention relates to computing-scales, and has for its object to provide a new and improved scale of this description.

My invention is illustrated in the accompanying drawings, wherein—

Figure 1 is a side view of a scale embodying my invention. Fig. 2 is a longitudinal section of the scale-beam, showing the computing mechanism. Fig. 3 is a section on line 3 3, Fig. 2. Fig. 4 is a section on line 4 4, Fig. 2. Fig. 5 is a section on line 5 5, Fig. 1.

Like letters indicate like parts throughout the several figures.

My invention may be applied to a scale of any description, and I therefore do not limit myself to any particular construction. For purposes of illustration, however, I have shown my invention in the drawings as associated with an ordinary scale. Associated with the scale-beam A is a suitable computing mechanism connected with the poise B, which moves along the scale-beam to indicate the weight of the article. In the present instance the computing mechanism is constructed to indicate the price of the article weighed at a given weight per pound. It is of course evident that any other desired result can be computed, and I of course do not limit myself in any manner to any given result.

Referring now to the drawings, I provide a suitable casing C, in which is mounted a movable part D, carrying a series of tabulated figures representing the result desired, which in this instance is the price per pound or fraction thereof. I have not shown in detail these tabulated figures, as they are no part of my present invention. The casing C is provided with a suitable opening through which the tabulated figures on the movable part D are exposed. This opening is illustrated in the drawings as consisting of the long slot C', preferably covered with a piece of transparent material $C^2$. Above the slot C' is located a series of numbers $C^3$, forming a stationary graduated scale and representing in this instance the price per pound. The movable part D is connected with the poise B, so that as said poise is moved out along the beam the tabulated figures thereon are moved past the opening C', so as to be opposed to the figures $C^3$ of the stationary graduated scale.

In operating the device the article to be weighed is placed upon the scale and the poise moved to the proper position to balance it. This movement of the poise moves the tabulated figures to such a position that the figures exposed through the opening C' will denote the price of the material weighed. If the material is to sell at ten cents per pound, the figure exposed through the opening C' and directly beneath the figure "10" on the stationary graduated scale will be the price for the amount of material on the scale and can be easily read by the operator, thus saving the operator the necessity of computing the price, as is necessary when the ordinary scale is used, and obviating the liability to error in this process. It is of course evident that the spacing of the figures and their arrangement will depend upon the size and construction of the parts and the result desired. When the scale is small, so that a series of extra weights can be attached to the end of the beam, the figures will be arranged to provide for the proper reading when such weights are used. As illustrated in the drawings, I provide a flexible connection between the poise B and the movable part D. This connection may be of any suitable description, and, as herein shown, consists of a flexible cord B', connected with the poise B and passing down through one of the supports $C^4$, by means of which the casing C is attached to the beam. The beam proper is provided with a groove or opening A', in which the flexible connection B' is received, so that said connection is concealed from view and protected from injury. I prefer to provide the pulleys $B^2$ $B^3$ for the flexible connection, so as to facilitate the operation of the parts. The flexible cord B' is connected with the movable part D in any desired manner. As herein shown, a suitable drum or pulley D' is connected with the end of the movable part D and the flexible cord is connected therewith. As herein illustrated, the pulley or drum D' is provided with a spiral groove D², in which the flexible cord is received. The parts must be so arranged that when the poise is moved to its extreme outward position the movable part D will be rotated through one revolution. When the poise is in its initial position, the length of the flexible cord wound around the drum or pulley is preferably greater than the circumference of the pulley, so as to allow for adjustment and still permit the movable part D to be rotated a complete revolution by the movement of the poise to its extreme outward position. I prefer, however, to give the flexible cord, say, two turns around the drum or pulley in order to facilitate the operation of rotating the same. Some suitable means of adjusting the flexible cord should be provided, so that the poise may be properly adjusted with relation to the movable part D. Any suitable construction for this purpose may be used, and, as herein illustrated, I have shown the poise as provided with a bolt B⁴, to which the end of the cord B' is attached. The length of the cord may be adjusted by rotating the bolt and the bolt is held in its adjusted position by tightening the nut thereon.

The poise B may be constructed in any desired manner, and, as herein shown, consists of two parts connected together by suitable screws or bolts. The movable part D is suitably mounted in any desired manner—as, for example, upon the adjustable pins D³—and is rotated in one direction by pulling out the poise. Some suitable means should be provided for rotating said movable part in the other direction. Any construction for this purpose may be used, and, as herein shown, I provide a coiled spring D⁴, contained within the pulley or drum D'. One end of the coiled spring is attached to the movable part D and the other end to some fixed part. As herein shown, one end of the spring is connected with the drum and the other with the pin D³. (See Fig. 3.)

I have described in detail a particular construction embodying my invention; but it is of course evident that this construction may be varied and that parts may be omitted and others used in connection with parts not herein shown without departing from the spirit of my invention. I therefore do not limit myself to the construction shown.

The use and operation of my invention are as follows: When the parts are in operative relation and properly adjusted, the poise is normally at the end of the beam next to the scale. If now it is desired to find the price of a given amount of any article, the article is placed upon the scale and the poise moved out, so as to balance it. This movement of the poise through the agency of the concealed flexible connection rotates the movable part D, thus winding the spiral spring, and when said poise is moved to the proper position the operator ascertains the price of the quantity of material weighed by examining the figures exposed through the slot C'. The poise may now be returned to its initial position and the coiled spring associated with the part D will move said part to its initial position.

It will thus be seen that I have here a simple and efficient construction by means of which certain results, such as the price of a given quantity of material, may be obtained without computation, such result being simply read from the device itself. It will also be seen that the several parts are concealed and located in a convenient position and in a small amount of space, so that this construction may be applied to any desired form of scale.

I claim—

1. A computing-scale, comprising a scale-beam, a poise adapted to move along said beam, a computing mechanism located beneath said beam and connected therewith, a flexible connection between said poise and said computing mechanism, said flexible connection passing through one of the supports by which the computing mechanism is attached to the beam.

2. A computing-scale, comprising a scale-beam provided on its under side with a groove or opening, a poise associated with said beam and adapted to be moved therealong, a computing mechanism located below the beam and connected therewith, a flexible cord connected with said poise, said cord received into the groove or opening in the beam and passing through one of the supports by which the computing mechanism is attached to said beam so as to be concealed and protected.

3. A computing-scale, comprising a scale-beam having a groove or opening therein, a poise associated therewith and adapted to be moved therealong, a cylinder rotatably mounted in proximity to said beam and supported thereby, said cylinder carrying a series of tabulated figures, a drum connected with one end of said cylinder, a flexible cord connected with said drum and with said poise, said cord passing through one of the supports for the drum and received by the groove or opening in said beam, so as to be concealed and protected, a spiral spring connected with said cylinder and with a fixed part so as to be wound when the poise is moved outwardly along the beam.

4. A computing-scale, comprising a horizontal beam, a poise adapted to move along said beam, a computing mechanism suspended from, substantially parallel with and beneath the beam and comprising an exterior substantially-cylindrical casing, an interior rotating substantially-cylindrical indicator and a flexible connection between the poise and such cylindrical indicator, whereby the latter is rotated when the poise is moved in one direction, and means for moving the indicator toward its initial position when the indication has been made.

5. A computing-scale, comprising a horizontal beam, having a groove along its under side, a poise adapted to move therealong, a computing mechanism, a flexible cord connection attached to the poise, within the same and lying in the groove in the beam, and connected with the computing mechanism so that the cord is concealed at the point of its connection with the poise and through the line of its parallelism with the beam.

LEWIS P. HALLADAY.

Witnesses:
M. E. ROWAN,
K. P. DRYSDALE.